United States Patent [19]

Spruit et al.

[11] Patent Number: 5,442,597
[45] Date of Patent: Aug. 15, 1995

[54] APPARATUS FOR WRITING AND READING A MAGNETO-OPTICAL RECORD CARRIER

[75] Inventors: Johannes H. M. Spruit; Bernardus A. J. Jacobs; Cornelis M. J. Van Uijen, all of Eindhoven, Netherlands

[73] Assignee: U.S. Philips Corporation, New York, N.Y.

[21] Appl. No.: 166,804

[22] Filed: Dec. 14, 1993

Related U.S. Application Data

[63] Continuation of Ser. No. 790,109, Nov. 18, 1991, abandoned, which is a continuation of Ser. No. 347,610, May 2, 1989, abandoned.

[30] Foreign Application Priority Data

Feb. 15, 1989 [NL] Netherlands .............. 8900362

[51] Int. Cl.⁶ ............................................ G11B 11/00
[52] U.S. Cl. ............................. 369/13; 369/44.370; 369/44.380; 369/121
[58] Field of Search .............. 369/13, 44.37, 44.38, 369/121, 122; 360/59, 114; 365/122

[56] References Cited

U.S. PATENT DOCUMENTS

| | | | |
|---|---|---|---|
| 3,869,193 | 3/1975 | Schmit | 350/6 |
| 4,176,377 | 11/1979 | Howe | 358/128 |
| 4,466,004 | 8/1984 | Kobayashi et al. | 369/13 X |
| 4,544,443 | 10/1985 | Ohta et al. | 369/13 X |
| 4,549,287 | 10/1985 | Hatano et al. | 360/114 X |
| 4,694,447 | 9/1987 | Cohen et al. | 369/122 |
| 4,730,293 | 3/1988 | Pierce et al. | 369/122 |
| 4,853,912 | 8/1989 | Arasara et al. | 369/13 |
| 4,922,454 | 5/1990 | Taki | 369/13 |
| 5,065,377 | 12/1991 | Spruit et al. | 369/13 |

OTHER PUBLICATIONS

Audio Eng. Soc. 78 Hr. Conv. 1983 pp. 1–14.
Electronics Mag. Aug. 1988 p. 43.

Primary Examiner—Joseph A. Popek
Assistant Examiner—Tan Nguyen
Attorney, Agent, or Firm—Michael J. Balconi-Lamica

[57] ABSTRACT

An apparatus for writing and reading a magneto-optical record carrier (1) with an increased information density are described. Information areas (4) which are smaller than the write spot ($V_w$) supplied by a first diode laser (40) can be written by a switched magnetic field. The areas can be read with a read spot ($V_r$) which is smaller than the write spot, which read spot is formed by radiation from, for example an assembly of a second diode laser (42) and a frequency doubler (43).

22 Claims, 4 Drawing Sheets

APPARATUS FOR WRITING AND READING A MAGNETO-OPTICAL RECORD CARRIER

This is a continuation of application Ser. No. 07/790,109, filed Nov. 8, 1991, abandoned, which is a continuation of application Ser. No. 07/347,610 filed May 2, 1989.

BACKGROUND OF THE INVENTION

The invention relates to a method of writing and subsequent reading of information in a magneto-optical information layer of a record carrier by means of diode laser radiation, which radiation is focused to a diffraction-limited radiation spot on the information layer, and by means of a movement of said radiation spot and the record carrier relative to each other, information being written by locally changing, at the location of the radiation spot formed by the write beam, the direction of magnetization of areas in the information layer by means of a diode laser write beam and a magnetic field, the information areas thus formed being read by detection of the variation, caused by the information areas, of the state of polarization of a diode laser read beam. The invention also relates to an apparatus for performing the method and to a magneto-optical record carrier suitable for use of said method.

Such a method and apparatus are known from, for example the Article "Experiments towards an erasable Compact Disc Digital Audio System" in "Audio Engineering Society", 73 Conv. 1983, pp. 1–14 and the associated nine Figures. The apparatus described in this Article comprises a diode laser for supplying a write beam as well as a read beam. The two beams are focused to a diffraction-limited radiation spot having a half value width of the order of 1 μm. The size of the written information area, in tile form of a magnetic domain, is determined by the dimension of this radiation spot. In the known system the information area is round and has a diameter of the order of 1 μm and the information density is of the order of 400,000 bits per mm². The information density may be increased to approximately 1,000,000 bits per mm².

There is an ever increasing need of information densities which are larger than the ones stated above, so that more information can be recorded in a record carrier of the same dimensions. To this end it must be possible to write and read information areas in a magneto-optical record carrier, which areas are smaller than the ones that have hitherto been conventional. Within the present concept of magneto-optical information recording in which one radiation source and one radiation spot are used for writing and reading, the envisaged object can be realised by reducing this radiation spot.

Since the size of the diffraction-limited radiation spot is proportional to λ/NA, in which A is the wavelength of the radiation used and NA is the numerical aperture of the objective system used, the radiation spot can only be reduced by decreasing the wavelength and/or increasing the numerical aperture. An increase of the numerical aperture involves a decrease of the depth of focus of the radiation beam, so that the requirements imposed on the focusing of the radiation beam will become more stringent. Moreover, an objective system having a larger numerical aperture is more sensitive to aberrations so that more stringent tolerance requirements must be imposed on the write-read apparatus. If it is desirable to continue the use of a diode laser as a radiation source, which is necessary in a mass product which the magneto-optical write-read apparatus is intended to be, it is not a real possibility to decrease the wavelength of the radiation beam, because there are no short wavelength diode lasers which have a sufficiently high power for the writing operation.

SUMMARY OF THE INVENTION

The present invention provides a novel concept of magneto-optical information recording enabling known techniques to be combined in such a way that an increase of the information density on a magneto-optical record carrier can be realised with simple means.

This novel concept results in a novel method of writing and reading a magneto-optical record carrier, which is characterized by the following combination of measures:

information areas, whose dimension in the direction of movement is smaller than that of the write-radiation spot, are written by switching the magnetic field in time intervals which are shorter than the time interval required to move the record carrier and the radiation spot with respect to each other over a distance which is equal to the dimension of the radiation spot in the direction of movement, reading is effected by means of a diode laser beam whose wavelength is shorter than that of the diode laser beam with which writing is effected.

Since the writing and reading operations no longer require one and the same radiation beam, but beams with different wavelengths and different powers, greatly reduced information areas can be written by means of known techniques and these areas can be read with a greatly reduced read spot, while nevertheless using conventional diode lasers.

It is to be noted that it is known per se, for example from German Patent Application no. 3,200,134, to provide information areas in the form of magnetic domains in a magneto-optical record carrier by means of a scanning laser beam focused to a radiation spot and by means of a magnetic field switched at a high frequency, such the dimensions of these information areas in the scanning direction is smaller than the dimension of the radiation spot. In this method the entire area of the information layer under the radiation spot is first magnetized in a direction opposed to the original direction of magnetization of the information layer. Subsequently, while a part of the radiation spot is still over the said area, the magnetic field is reversed so that the said part of the area again acquires the original direction of magnetization. The German Patent Application no. 3,200,134 does not state how the magnetic domains thus obtained with a reduced dimension in the scanning direction can be read.

Furthermore, it is known, for example from the Article "Blue-Light Laser ups CD Density" in "Electronics", August 1988, p. 48 that when reading an optical record carrier use can be made of the combination of a conventional diode laser which emits infrared radiation and a so-called frequency doubler in the form of a nonlinear optical crystal. This combination yields a blue laser beam having a wavelength of the order of 400 nm with which a read spot can be formed whose diameter is approximately half that of a radiation spot formed by a beam from the diode laser alone. However, this Article also states that the intensity of the blue radiation spot is too small to write information areas with it and that the reduced information areas can only be written with a blue laser of a higher power, such as a gas laser.

According to the present invention the techniques described in the two above-mentioned Articles are combined for the first time, which is possible by abandoning the idea that one radiation source must be used for writing and reading a magneto-optical record carrier.

By using the inventive concept the dimension of the information areas in the scanning direction is considerably reduced so that the information density in this direction is considerably increased.

To increase the information density also in a direction transverse to the scanning direction, use is made, in accordance with a second aspect of the present invention, of a record carrier which is characterized by a structure of previously provided tracks whose width substantially determines the width of the information areas.

Since the tracks are physically or geometrically distinguished from the rest of the information layer, it is achieved that the information areas remain enclosed within the tracks. In principle, this reduces the risk of crosstalk and the tracks may be located slightly closer to one another, provided that it is prevented that the read spot covers not only a track to be read but also a part of a contiguous track.

This record carrier is preferably further characterized in that the period of the track structure, transverse to the track direction, is smaller than 1.4 μm.

This track period is smaller than the track period conventionally used in the current optical record carrier, which conventional period is chosen to be able to use simple optical systems and conventional diode lasers.

A first embodiment of a record carrier in which the effect of enclosure of the information areas within the tracks is realised, is characterized in that the track structure is a relief structure and in that the magneto-optical layer has a constant thickness and comprises a material in which during writing information areas are formed by means of magnetic domains starting from a core and expanding outwardly.

In this material, which is referred to as bubble-model material in literature, for example in the Article "Thermomagnetic Writing in TbFe: Modelling and Comparison with Experiment" in "J. Appln. Phys." 64 (2), July 1988, pp. 252–261, a magnetic domain is formed in that firstly a small magnetic domain (core) is formed in the centre of the write spot and subsequently the wall of this core moves outwards provided with sufficient energy is supplied. The relief tracks may consist of grooves in or ridges on a support of the magneto-optical material, which tracks have walls with a given slope so that the transitions from the bottom or the top of a track to the wall thereof are sharply kinked. These walls constitute a barrier against the expansion of a domain outside the track. In order to cause the domains to expand outside a track, a quantity of extra energy is required which is not available because the radiation spot is moved at a comparatively large speed relative to the record carrier.

The first embodiment of the record carrier is, for example further characterized in that the magneto-optical material is an alloy of Gadolinium-Terbium-Iron.

This material has an outstanding "bubble" effect and, if combined with a relief track structure, it is well suitable to attain the desired constriction of the information areas.

It is to be noted that it is known per se, for example from the above-mentioned Article in "Audio Eng., Soc.", 73rd Conv. 1983, pp. 1–14, to make use of a record carrier with previously provided tracks in a magneto-optical information recording system. In the known systems these tracks are only used as servotracks so as to achieve that the information areas are inscribed in accordance with accurately determined tracks. In the system according to the present invention these tracks are also used to limit the dimension of the information areas transverse to the track direction.

Another record carrier according to the invention, in which the effect of enclosure of the domains within the tracks is realised, is characterized in that the magneto-optical layer within the tracks has a greater sensitivity to magnetization than outside tile tracks.

A first embodiment of this record carrier is characterized in that the magneto-optical layer within the tracks has a different chemical composition than outside these tracks.

Consequently, the energy required for forming a magnetic domain within a track is smaller than the energy required for forming a magnetic domain outside a track.

A second embodiment of this record carrier is characterized in that the thickness of the magneto-optical layer within a track is different from that outside a track.

It is to be noted that it is known per se from U.S. Pat. No. 4,176,377 to provide tracks in an optical record carrier which are more sensitive to the write energy than are areas outside the tracks so as to be able to form narrow information areas with a relatively large write spot. However, the information areas of the known record carrier are not reduced in the track direction as well. Moreover, U.S. Pat. No. 4,176,377 does not reveal how the constricted information areas can be read optimally.

The use of record carriers with narrow tracks only makes sense in combination with the method according to the invention, because it is only then that during writing the possibilities of this record carrier can be utilized to an optimal extent with relatively simple means and that subsequently the information tracks can be read without any crosstalk.

A further aspect of the invention relates to the apparatus for performing the novel method. This apparatus, which comprises a radiation source for supplying a scanning beam, an objective system for focusing the scanning beam to a scanning spot on the information layer, a magnetic system for generating a magnetic field at the location of the scanning spot and a radiation-sensitive detection system for converting radiation from the record carrier into electric signals, is characterized in that the radiation source is a composite source for supplying a write radiation beam having a first wavelength and a first intensity for forming a write radiation spot, and for supplying a read radiation beam having a second wavelength, which is shorter than the first wavelength, and a second intensity, which is smaller than the first intensity, for forming a read radiation spot which is smaller than the write radiation spot.

This apparatus is preferably further characterized in that the radiation source is constituted by a first diode laser for supplying a write radiation beam having a first wavelength and by an assembly of a second diode laser and an optical frequency-doubling element for supplying a read radiation beam having a second wavelength of the order of half the first wavelength.

If a diode laser becomes available which itself emits the short-wave blue radiation with a sufficient power, such a blue diode laser can be used for reading instead of the said assembly of a red diode laser and a frequency-doubling element.

A second embodiment of the apparatus is characterized in that the radiation source is constituted by one diode laser, a controllable deflection element arranged in the path of the diode laser beam for selecting one of two radiation paths for the diode laser beam, and a frequency-doubling element arranged in one of the two radiation paths.

The deflection element may be constituted by an adjustable refractive or reflective element, such as a prism, but also by an electro-optical element, for example an electro-optical modulator such as a so-called Bragg deflector.

BRIEF DESCRIPTION OF THE DRAWINGS

Embodiments of the invention will now be described in greater detail with reference to the accompanying drawings in which.

DETAILED DESCRIPTION OF THE PREFERRED EMBODIMENTS

Figure 1:
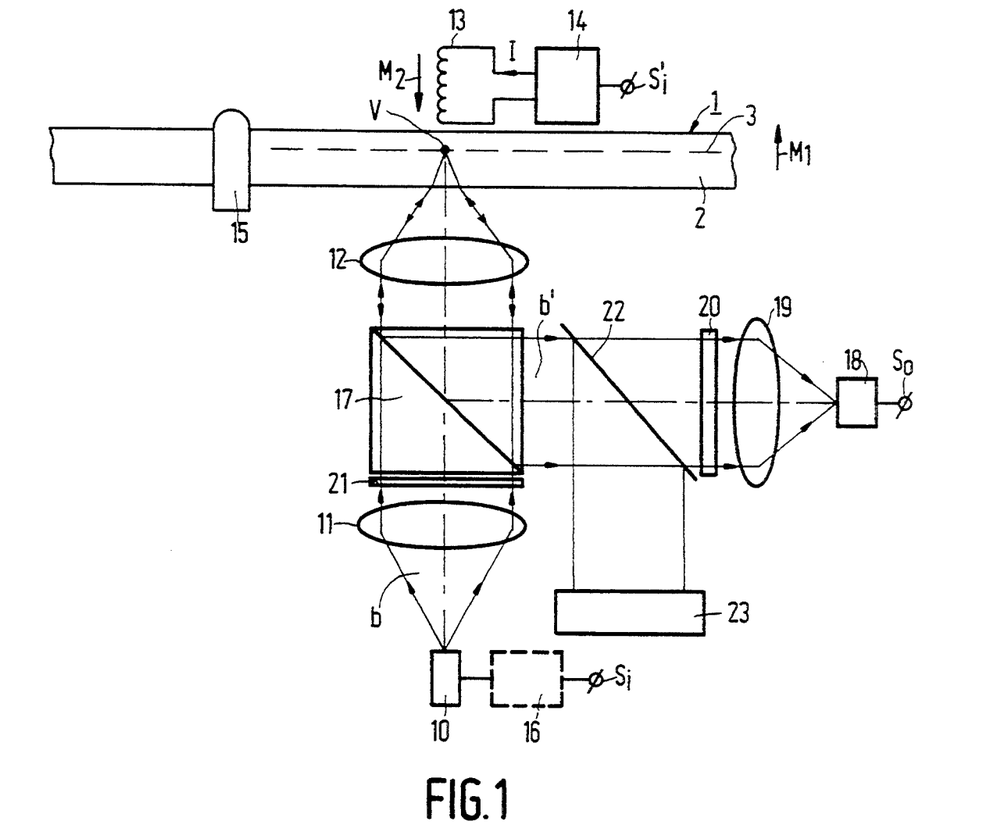
FIG. 1 shows a known write-read apparatus for a magneto-optical record carrier.

In FIG. 1 the reference numeral 1 denotes a magneto-optical record carrier comprising a transparent substrate 2 and a magnetic information layer 3. This information layer is irradiated by a radiation beam b supplied by a source 10. This source is constituted by a diode laser, for example an AlGaAs laser which emits radiation at a wavelength of the order of, for example 800 nm. A part of the radiation emitted by the diode laser is received by a collimator lens 11 and is focused to a diffraction-limited scanning spot V with a half value width of the order of 1 $\mu$m in the information plane by an objective system 12 which is shown diagrammatically by means of a single lens.

Information areas in the form of magnetic domains can be written in the layer 3 by controlling the diode laser in such a way that it emits light pulses having a pulse duration of, for example 50 nsec and intervals of, for example 250 nsec. The peak power of such a pulse is, for example 40 mWatt of which ultimately, for example 10 mWatt reaches the radiation spot V due to losses in the radiation path. This power is sufficiently high to heat the area on the information layer 3 to a given temperature, for example 200° C. The magnetic layer 3 is premagnetized in a given direction, indicated by the arrow $M_1$. By heating the layer 3 at the location of the radiation spot V, the coercive force in situ decreases and the direction of magnetization can be locally reversed, in accordance with the arrow $M_2$ in FIG. 1, by means of a relatively small external magnetic field generated with the aid of a magnetic coil 13. After the laser pulse has been terminated, the material of the layer 3 cools down again, freezing, as it were, the direction of magnetization $M_2$.

Figure 2:
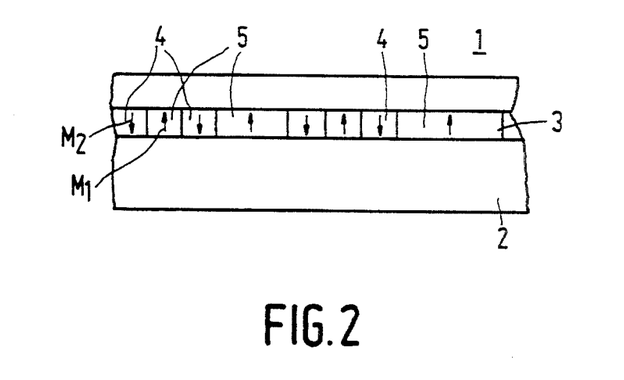
FIG. 2 shows in a cross-section a part of an information track inscribed by means of this apparatus.

By moving the radiation spot V and the record carrier 1 with respect to each other, for example by rotating the record carrier around the shaft 15 in the case of a round disc-shaped record carrier, a plurality of information areas can be written one after the other in the scanning direction so that an information track is obtained. FIG. 2 shows a small portion of such an information track in a cross-section. The areas of the information layer 3 where the direction of magnetization has been reversed ($M_2$) are indicated by information areas 4 and the areas which have maintained the original direction of magnetization ($M_1$) are referred to as intermediate areas 5. A plurality of tracks can be written one next to the other by moving the radiation spot V and the record carrier 1 with respect to each other in a direction perpendicular to the plane of the drawing in FIG. 1, which in the case of a round disc-shaped record carrier is the radial direction.

There are different possibilities of writing the information. In the first place, as already stated hereinbefore, the control current for the diode laser 10 can be modulated by means of the control circuit 16 with the information signal $S_i$ to be written, so that the laser emits radiation pulses in accordance with the signal to be written. The magnetic field is then continuously present during the writing process.

A second possibility is to switch the magnetic field between the directions $M_1$ and $M_2$ in accordance with the information to be written. Then the signal $S_i$ to be written is applied to a control circuit 14 which supplies the electric current for the coil 13. The diode laser can then either supply a continuous beam or a beam pulsed at a fixed frequency, a so-called clock frequency.

When reading the written information, use is made again of the diode laser 10 in the apparatus according to FIG. 1. However, this laser is then operated at a considerably lower power, for example ten times lower, than during the writing process, so that the recorded information is not affected. Preferably, the record carrier is reflecting so that the beam incident on the information layer and modulated by this layer in accordance with the written information is reflected towards the objective system 12. The radiation path incorporates a semitransparent element, for example a 70% transparent mirror or prism 17 which reflects a portion of the reflected and modulated read beam b' towards a radiation-sensitive detection system 18. In the embodiment of FIG. 1 a lens 19 for concentrating the radiation on the detection system 18 is arranged between the element 17 and this system.

Reading of the information layer is based on the change which the information areas, or domains, 4 cause in the state of polarization of the read beam. To detect this change, a polarization analyser 20 is arranged in the radiation path in front of the detection system 18, which analyser converts the polarization modulation into an intensity modulation which is converted into an electric signal $S_0$ by the detection system. A polarizer 21 whose direction of polarization effectively extends at an angle of, for example 85° to that of the analyser 20 may be arranged in the radiation path of the projected read beam b.

In order to be able to find out whether during reading the read spot is centred on the information track and/or whether the read beam is focused on the information plane, a semi-transparent, for example 90% transparent mirror or prism 22 may be arranged in the radiation path of the reflected beam b', which mirror or prism reflects a part of this beam towards a second radiation-sensitive detection system 23. The electric signals supplied by this detection system are used to correct tracking and focusing. Also during writing the tracking and focus servo-systems may be used, utilizing the part of the write beam reflected by the record carrier. For further particulars about writing and reading of a magneto-optical record carrier and about the apparatus therefor reference may be made to the above-mentioned Article in "Audio Eng. Soc." 78th Conv. 1983, pp. 1–14, and to the Article "Erasable Magneto-Optical Recording" in "Philips Techn. Rev." 42, No. 2, August 1985, pp. 37–47.

Figure 3:
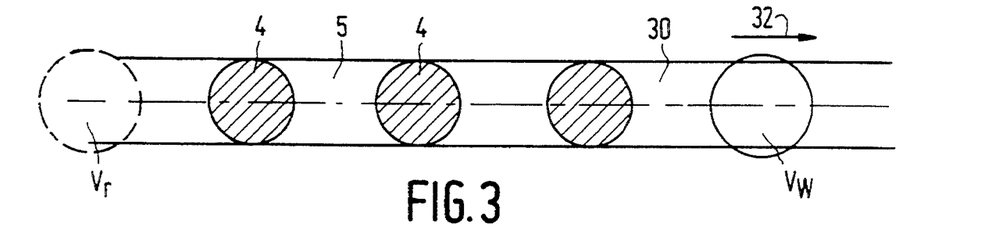
FIG. 3 shows the dimension of the information areas inscribed by means of the known apparatus relative to the dimension of the write spot and the read spot used in this apparatus.

In the apparatus according to FIG. 1 the write spot and the read spot have the same dimension, which dimension also determines the dimension of the information areas. FIG. 3 shows the write spot $V_w$ of this apparatus and a plurality of information areas 4 written by means of this spot. The information areas are arranged in accordance with an information track 30. This track is only partly written. During writing the write spot moves to the right with respect to the information plane, in accordance with the arrow 32. In the situation shown in FIG. 3 the write spot is present above a non-inscribed portion and at a position where a subsequent information area can be written. The information track is afterwards read by means of the read spot $V_r$ which is indicated at the left in FIG. 3.

Figure 4:
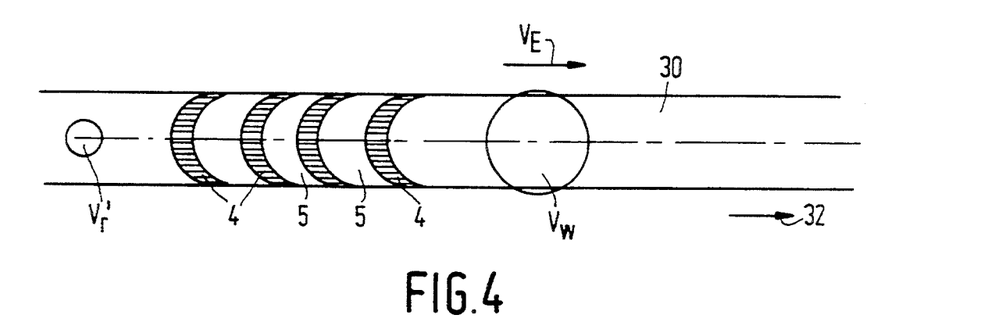
FIG. 4 shows the dimension of the information areas inscribed by means of the apparatus according to the invention relative to the write spot and the read spot used in this apparatus.

According to the present invention use is made of a radiation spot during writing which is different from the radiation spot used during reading, the purpose of which is to be able to write and read smaller information areas than those shown in FIG. 3. FIG. 4 shows diagrammatically the principle of this invention. Analogously as in FIG. 3, this Figure shows inscribed information areas 4, the write spot $V_w$ and the read spot $V_r'$. In principle, the write spot $V_w$ has the same dimension and intensity as that in FIG. 3. This radiation spot is obtained by focusing, by means of the objective system 12 of FIG. 1, a laser beam from, for example an AlGaAs diode laser which emits radiation at a wavelength of, for example 800 nm and has a sufficiently large power for writing. This spot has a half value width of, for example 1 $\mu$m.

Figure 5:
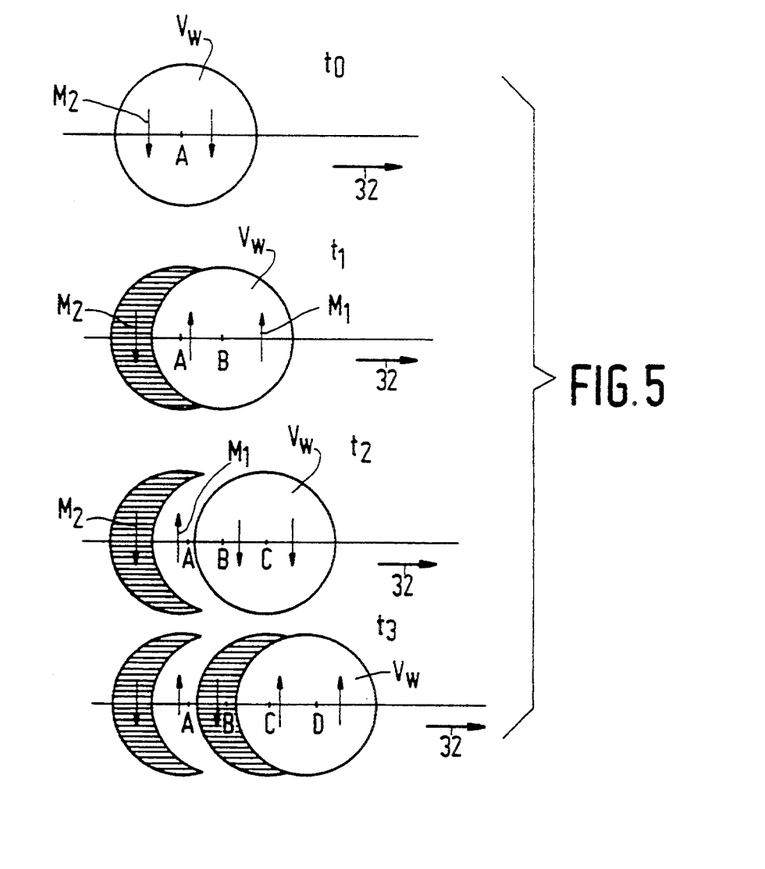
FIG. 5 illustrates the principle of writing shortened information areas.

To be able to write information areas with a surface area which is smaller than the size of this write spot, use is made of the known principle illustrated in FIG. 5. In this Figure it is assumed that the radiation spot is observed in the direction of the ongoing beam b in FIG. 1. It has been assumed that the write spot moves to the right at a speed VE with respect to the information plane. At the instant $t_0$ the centre of the write spot $V_w$ is at the position A. At that moment the external magnetic field has the direction of the arrow $M_2$ in FIG. 1 and the entire circular area under the radiation spot is magnetized in that direction. At the instant $t_1$ the centre of the radiation spot $V_w$ has reached the point B. Then the direction of the magnetic field is reversed so that the area, which is now under the spot $V_w$, is magnetized in the direction $M_1$. Since the distance between B and A is considerably smaller than the diameter of the write spot, a large part of the area which was magnetized in the direction $M_2$ at the instant $t_0$ is magnetized again in the original direction $M_1$. The result is that only a small part, which is shaded in FIG. 5, of the area present under the write spot at the instant $t_0$ is magnetized in the direction $M_2$ and forms an information area, while the rest of this area is erased again and is available for writing a subsequent information area. This information area is subsequently written by switching the magnetic field in the direction $M_2$ at the instant $t_2$, when the centre of the write spot has reached the position C, and by switching the magnetic field back again in the direction $M_1$ at the instant $t_3$, when the centre of the spot has reached the position D. By switching the external magnetic field, in the case of a write spot moving at a continuous speed relative to the record carrier, in time intervals which are shorter than the time interval required to move the write spot over a distance which is equal to its diameter, information areas can be written whose dimension in the scanning direction is smaller than this dimension of the write spot. These information areas may have a dimension of, for example 0.35 $\mu$m in the scanning or track direction, instead of the hitherto conventional dimension of the order of 1 $\mu$m. Thus, the information density in the track direction can be increased considerably.

To be able to read these small information areas in a discriminatory manner, a read spot must be used whose dimension in the track direction is of the same order as that of the information areas. To be able to use the same objective system for forming this read spot and for forming the write spot, the wavelength of the read beam must be considerably smaller than that of the write beam.

According to the invention the magneto-optical write and read apparatus may be provided with a second radiation source which is composed of a diode laser and a non-linear optical crystal in which the frequency of the radiation emitted by the diode laser is doubled through the phenomenon which is known as "second harmonic generation" or "SHG". Doubling of the frequency of the laser radiation means halving the wavelength of this radiation. When using an infrared diode laser emitting a wavelength of the order of 800 nm, blue radiation with a wavelength of the order of 400 nm is then obtained when using the second harmonic generator. A beam of this wavelength can be focused by the objective system 12 to a read spot whose diameter is half that of the write spot.

As has been noted in the Article "Blue Laser ups CD Density" in "Electronics", August 1988, p. 48 in which the use of the blue diode laser module for reading prerecorded audio discs known under the name of "Compact Disc" has been described, the efficiency of the second harmonic generator is small and consequently the intensity of the blue laser radiation is low so that this diode laser module cannot be used for writing information in an optical record carrier. Therefore, this laser module cannot be used in a magneto-optical write-read apparatus in which only one radiation spot is used.

Since, according to the invention, separate radiation spots are used for writing and reading, the blue laser module can be used for obtaining the read spot. The two radiation spots, which are both supplied by diode lasers, can now be optimized for their specific functions, i.e. the write spot has such an intensity that the material of the information layer can be sufficiently heated therewith and the read spot is sufficiently small to be able to read the narrow information areas in a discriminatory manner.

Figure 6:
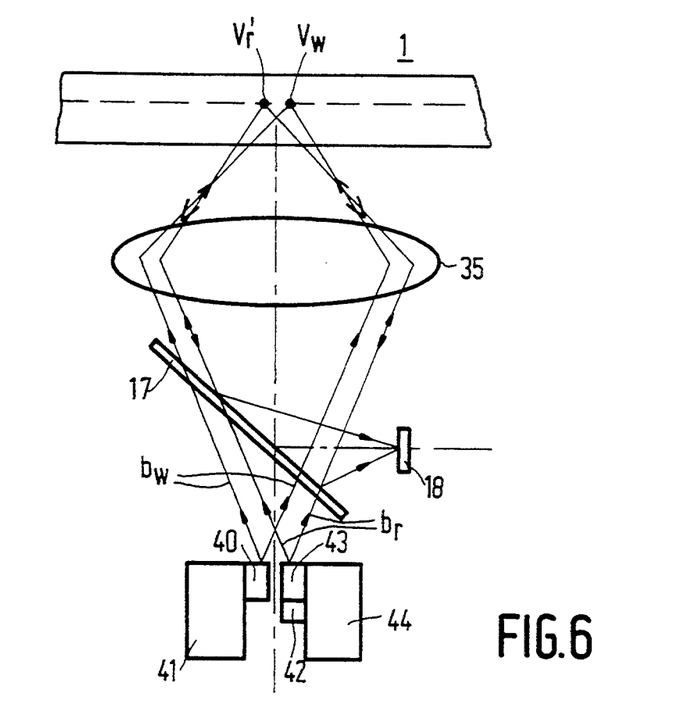
FIG. 6 shows an embodiment of the magneto-optical write and read apparatus according to the invention.

FIG. 6 shows diagrammatically an embodiment of the apparatus according to the invention. The paramount difference with the apparatus of FIG. 1 is that two radiation sources are used. The first source, which consists of a diode laser 40 mounted on a cooling block 41, supplies the write beam $b_w$. This laser is, for example an AlGaAs diode laser which emits radiation at a wavelength of the order of 800 nm. The second radiation source is constituted by a second diode laser 42, for example of the same type as the laser 40, and a frequency-doubling element 43, for example a Lithium-Niobate crystal. The elements 42 and 43 may be mounted on a separate cooling block 44, or on the same cooling block as the laser 40. Lenses for efficiently coupling the laser radiation in the frequency doubler may be arranged between the diode laser 42 and the frequency doubler 43. The blue laser module may comprise a filter to prevent infrared radiation from leaving the module.

As is shown in FIG. 6, the write beam $b_w$ is focused to a write spot $V_w$ and the read beam $b_r$ is focused to a read spot $V_r'$, the latter being, for example half as large as the write spot and having a considerably lower intensity.

In the embodiment of FIG. 6 an objective system 35 is used which simultaneously fulfils the function of the collimator lens 11 of FIG. 1 and which moreover renders the lens 19 superfluous. The apparatus according to the invention may also be composed of the elements shown in FIG. 1, or it may have a different construction, provided that two beams of different wavelengths and different intensities are focused in this apparatus to a write spot and a read spot, respectively, on the information layer 3. Instead of an AlGaAs diode laser having a wavelength of 800 nm, a different semiconductor laser with a different wavelength may be used alternatively.

Figure 7A:
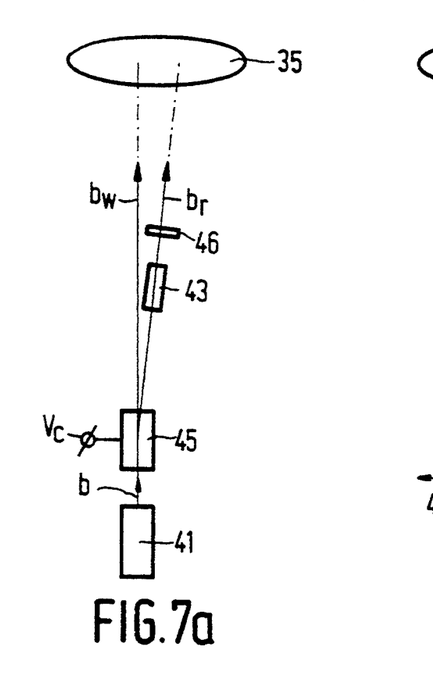
FIGS. 7a and 7b show alternative embodiments of the composite radiation source to be used in this apparatus.
Figure 7B:
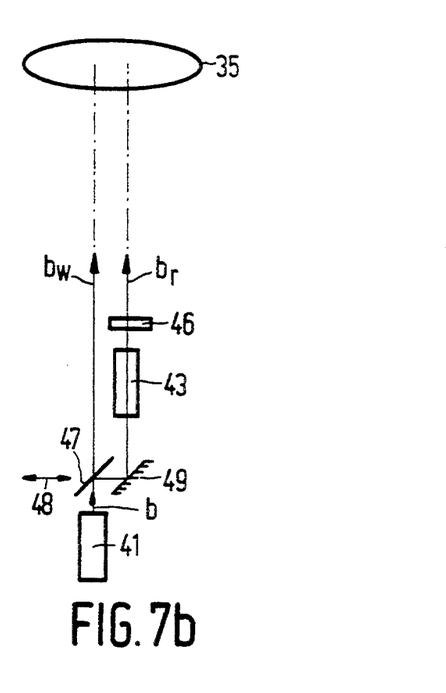

The invention may also be realised with one diode laser only. Then an adjustable deflection element must be incorporated in the radiation path for passing or not passing the laser beam through the frequency-doubling element. FIGS. 7a and 7b show two embodiments of a part of an apparatus including such an element. In FIG. 7a this element is an acousto-optical or an electro-optical deflection element 45. If this element is energized with a voltage $V_c$, a diffraction grating is formed therein which diffracts the incident laser beam b towards the frequency-doubling element 43. The beam $b_r$ emerging from this element then has a wavelength which is half that of the beam b. If the element 45 is not energized, the laser beam is not deflected and this beam is passed as a write beam $b_w$ with the original wavelength to the objective system 35. Of course the read beam $b_r$ should also pass through the objective system.

In the embodiment of FIG. 7b a mirror 47 is arranged behind the diode laser 41, which mirror can be moved into and out of the radiation path, as is denoted by the arrow 48. If the mirror has been moved out of the radiation path, tile laser beam b is passed as a write beam $b_w$ to the objective system 35. If the mirror has been moved into the radiation path, the laser beam b is passed to the frequency-doubling element 43, for example via a second mirror 49, and a read beam $b_r$ is obtained.

A filter 46 may be arranged in the path of the laser beam $b_r$, which filter either completely blocks the red laser radiation which may still emerge from the element 43 or attenuates it in such a manner that it cannot affect the written information. In the latter case the red laser radiation can be used during reading for generating a tracking-error signal and/or a focus-error signal in the way as is known for write and read apparatuses for optical record carriers.

Also in tile apparatus using two diode lasers, the red laser radiation can be used for generating the said error signals when reading with blue laser radiation. Moreover, the blue laser radiation can be used for generating the error signals during writing with red laser radiation.

It has been assumed in the foregoing that the write laser supplies a continuous beam. However, this laser is preferably pulse-controlled, a control signal being applied to the control circuit of this laser, which signal is zero at the instant when the magnetic field is switched in an analogous way as in FIG. 1. This has the advantage that the edges of the written domains 4 are defined more sharply so that the information signal which has been read contains less noise. Due to the shorter information areas this measure has an even more favourable effect than in a conventional magneto-optical record carrier and apparatus. A pulsed laser, must supply a higher peak power than with a continuously operated laser.

So far, only an increase of the information density in the track direction has been described. A second important aspect of the present invention relates to the increase of the information density in the direction transverse to the track direction.

The small read spot $V_r'$ shown in FIG. 4 is utilized to an optimum extent only in the track direction for reading short information areas, i.e. areas having a small dimension in the track direction. Since the read spot $V_r'$ is also small in the direction transverse to the track direction, narrow information areas, i.e. areas with a small dimension perpendicular to the track direction can also be read with this spot. According to the invention this possibility is used and furthermore narrow information areas are written by making use of a record carrier with a previously provided structure of narrow tracks and by writing the information areas in these tracks. It is ensured that the magnetic domains are substantially only formed within a track. A first embodiment of a record carrier which is suitable for this purpose comprises a relief track pattern and a "bubble" material, for example an amorphous alloy of gadolinium, terbium and iron.

Figure 8:
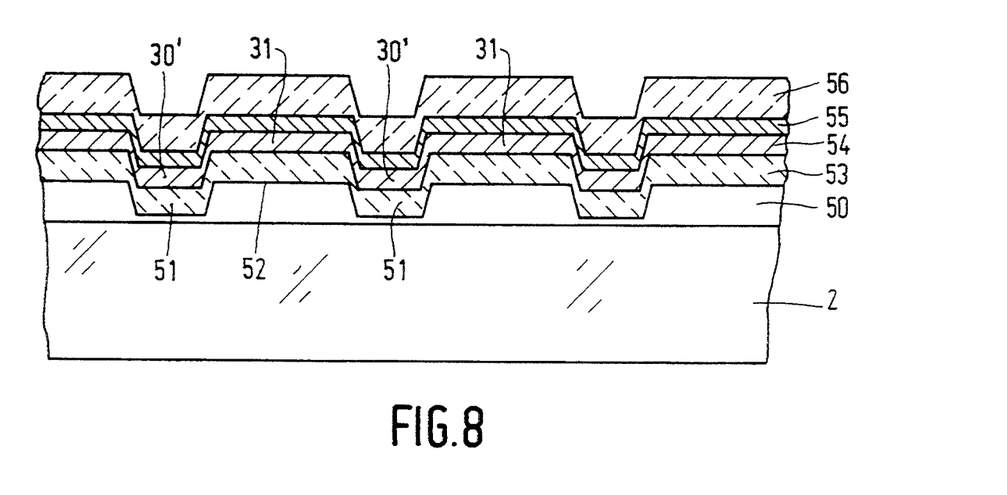
FIG. 8 shows in a radial cross-section a part of a first embodiment of a magneto-optical record carrier with previously provided tracks.

FIG. 8 shows an embodiment of such a record carrier. This Figure shows a small part of the magneto-optical record carrier in a radial cross-section. The record carrier comprises a transparent substrate 2 of glass or a synthetic material on which a layer 50 is provided in which the preformed tracks are present in the form of grooves 51. If the substrate is made of synthetic material, it is not necessary to provide a separate layer 50 and the grooves may be present in the substrate. The grooves are separated from each other by considerably wider intermediate areas or intermediate tracks 52. The layer 50 comprises, for example a transparent cured polymer, such as polycarbonate (PC) in which the grooves 50 are provided by means of the known replica technique which is used in the manufacture of "Compact Discs".

The layer 50 is coated with a dielectric layer 53 which separates the layer 50 from the magneto-optical layer 54. The surface of the layer 54 has the same structure as the layer 50 and is thus provided with tracks 30' and intermediate tracks 31. The layer 54 comprises, for example an amorphous alloy of iron, gadolinium and terbium and is internally magnetized in a direction perpendicularly to the record carrier surface. This layer is coated with a reflecting layer 55, for example of aluminium on which a protective layer 56 of, for example $SiO_2$ or a lacquer layer may be provided.

As described in, for example the above-mentioned Article in "J. Appl. Phys." 64 (1) July 1988, pp. 252–262, when writing in a "bubble" material, firstly a small magnetic core is formed in the centre of the radiation spot where the energy is largest, at the conventional diffraction-limited radiation spot with a Gaussian intensity distribution. The wall of this core is moved outwards so that the core grows to a magnetic domain. However, the walls of the grooves 30' form a barrier against this expansion, especially if the transition between such a wall and the bottom of a groove has a considerable kink. To overcome this barrier, extra energy would have to be supplied. Since the time interval, in which the write spot is present at the position to be written and in which the magnetic field has a given direction, is so short that little energy can leak from the centre of the area to be written to the exterior within this time interval, the magnetic domain is enclosed, as it were, within the track and the Blockwall of the magnetic domain coincides with a groove wall.

Figure 9:
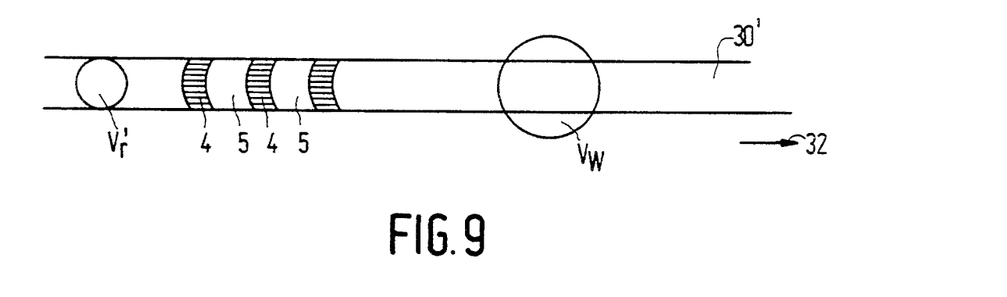
FIG. 9 shows the dimensions of information areas inscribed in such a record carrier relative to the dimension of the write spot and the read spot.

In analogy with FIG. 4, FIG. 9 shows a small part of a written track of the record carrier according to FIG. 8. The length, in the track direction 32, of the information areas 4 is the same as that in FIG. 4, but the width of the information areas is smaller than that in FIG. 4 due to the chosen smaller width of the grooves 30, of FIG. 8. This groove width is, for example 0.5 μm and the width of the intermediate tracks 31, is, for example 0.6 μm so that the information density in the radial direction is increased by a factor of 1.5 with respect to that of known record carriers having a groove width of 0.6 μm and an intermediate track width of 1 μm.

The preformed tracks may not only be formed by grooves in the layer 54 but also by ridges on this layer.

When using a relief track structure with a given track depth or height, these tracks can also be used during writing and reading for generating a tracking-error signal in the manner as described in U.S. Pat. No. 4,363,116 for an inscribable optical record carrier.

Figure 10:
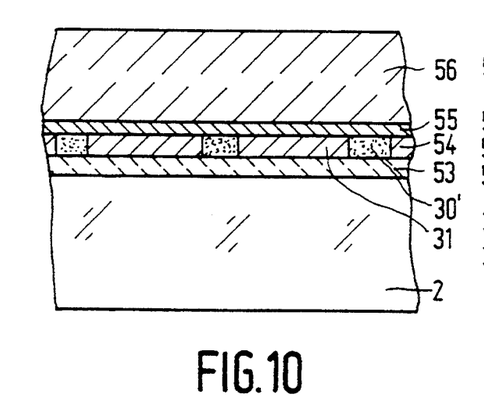
FIGS. 10 and 11 show in radial cross-sections parts of a second and a third embodiment of a magneto-optical record carrier with previously provided tracks.

In a second embodiment of a record carrier in which narrow information areas can be written the previously provided, narrowed tracks have a greater magnetization sensitivity than the rest of the information layer. The material within the tracks may then have a different chemical composition than the material outside the tracks. FIG. 10 shows a part of such a record carrier in a radial cross-section. This record carrier is distinguished from that of FIG. 8 in that the layer 50 with the grooves is absent and in that the magneto-optical layer 54 is flat. This layer comprises strips whose chemical composition slightly deviates from the rest of the layer, which strips constitute the tracks 30'.

Figure 11:
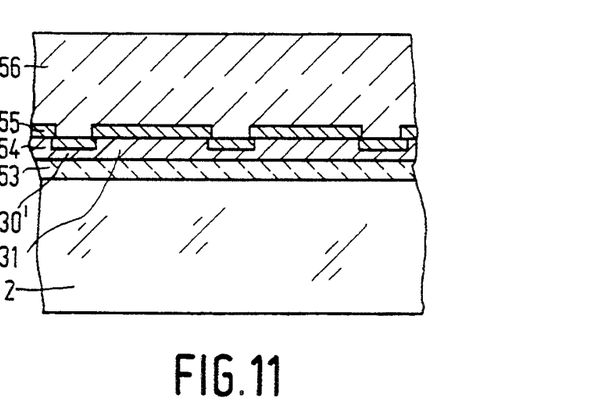

FIG. 11 is a radial cross-section of a part of a record carrier in which the tracks 30' have a greater magnetization sensitivity than their ambience 31 because the magneto-optical layer 54 is thinner at the area of the tracks than outside the tracks. Consequently the material within the tracks is brought to the desired temperatures at an earlier instant than the material in the rest of the layer so that the magnetization direction is only reversed within the tracks at a given speed of the write spot with respect to the record carrier.

FIGS. 10 and 11 also show that the protective layer 56 may be a thicker lacquer layer with a flat upper side instead of the thin $SiO_2$ layer with a profile, shown in FIG. 8.

We claim:

1. Apparatus for writing and subsequent reading of information in a magneto-optical information layer of a record carrier by means of diode laser radiation, which radiation is focused to a diffraction-limited radiation spot on an information layer, and by means of a movement of said radiation spot and the record carrier relative to each other, information being written by locally changing, at a location of the radiation spot formed by the write beam, a direction of magnetization of areas in the information layer by means of a diode laser write beam and a magnetic field, the information areas thus formed being read by detection of a variation, caused by the information areas, of a state of polarization of a diode laser read beam, wherein the improvement comprises the following combination of elements:

information areas, are written by modulating the magnetic field with a high frequency in accordance with the information signal to be written so that magnetic domains are formed which are smaller than the write radiation spot, and reading is effected by means of a diode laser read beam whose wavelength is shorter than that of the diode laser beam with which writing is effected so that the diode laser read beam forms a read spot which is smaller than the write radiation spot, the difference between the wavelengths of the diode laser read beam and the diode laser write beam being adapted to the difference between the dimensions in the direction of movement of the information areas and the write radiation spot.

2. Apparatus as claimed in claim 1 wherein the wavelength of the read beam is half that of the write beam.

3. Apparatus as claimed in claim 1, wherein the record carrier includes previously provided tracks whose width substantially determines the width of the information areas.

4. Apparatus as claimed in claim 3, wherein the distance between the track of the record carrier, transverse to the track direction, is smaller than 1.4 μm.

5. Apparatus as claimed in claim 3, wherein the tracks of the record carrier is a relief structure and in that the magneto-optical layer has a constant thickness and comprises a material in which during writing information areas are formed by means of magnetic domains starting from a core and expanding outwardly.

6. Apparatus as claimed in claim 5, wherein the magneto-optical material of the record carrier is an alloy of gadolinium, terbium and iron.

7. Apparatus as claimed in claim 3, wherein the magneto-optical layer within the tracks of the record carrier has a greater sensitivity to magnetization than outside the tracks.

8. Apparatus as claimed in claim 7, wherein the magneto-optical layer of the record carrier within a track has a different chemical composition than outside a track.

9. Apparatus as claimed in claim 7, wherein the thickness of the magneto-optical layer of the record carrier within a track is different from that outside a track.

10. An apparatus for reading and writing information on a magneto-optical record carrier having an information layer, comprising a radiation source for supplying a scanning beam, an objective system for focusing the scanning beam to a scanning spot on the information layer, a magnetic system for generating a magnetic field which is modulated in accordance with the information to be written at the location of the scanning spot and a radiation-sensitive detection system for converting radiation from the record carrier into electric signals, characterized in that the radiation source is a composite source for supplying a write radiation beam having a first wavelength and a first intensity for forming a write radiation spot, and for supplying a read radiation beam having a second wavelength, which is shorter than the first wavelength, and a second intensity which is smaller than the first intensity, for forming a read radiation spot which is smaller than the write radiation spot, further characterized in that the radiation source is constituted by a first diode laser for supplying a write radiation beam having a first wavelength and by an assembly of a second diode laser and an optical frequency-doubling element for supplying a read radiation beam having a second wavelength of the order of half the first wavelength.

11. An apparatus or reading and writing information on a magneto-optical record carrier having an information layer, comprising a radiation source for supplying a scanning beam, an objective system for focusing the scanning beam to a scanning spot on the information layer, a magnetic system for generating a magnetic field which is modulated in accordance with the information to be written at the location of the scanning spot and a radiation-sensitive detection system for converting radiation from the record carrier into electric signals, characterized in that the radiation source is a composite source for supplying a write radiation beam having a first wavelength and a first intensity for forming a write radiation spot, and for supplying a read radiation beam having a second wavelength, which is shorter than the first wavelength, and a second intensity which is smaller than the first intensity, for forming a read radiation spot which is smaller than the write radiation spot, further characterized in that the radiation source is constituted by one diode laser, a controllable deflection element arranged in the path of the diode laser beam for selecting one of two radiation paths for the diode laser beam, and a frequency-doubling element arranged in one of the two radiation paths.

12. Apparatus for reading and writing information in a magneto-optical information layer on a record carrier comprising:
means for providing a write radiation beam of a first wavelength and a first intensity;
an objective system for applying and focusing said write radiation beam upon said magneto-optical information layer on said record carrier;
means for applying a switchable magnetic field to said information layer in the area upon which said write radiation beam impinges on said magneto-optical layer;
means for providing relative motion between said information layer and said means for applying a write radiation beam and said means for applying a switchable magnetic field;
means for controlling said means for applying a magnetic field so that magnetic domains are formed in said magneto-optical layer which are smaller in length, measured in the direction of said relative motion, than the diameter of the write radiation beam;
means for providing a read beam, said read beam having a wavelength shorter than said write beam and an intensity less than said write beam, said read beam further having a wavelength such that the size of a read spot provided by said read beam is of the same order as the size of the domains, measured in the direction of said relative motion, written by said write beam; and
means for focusing said read beam on said magneto-optical layer through the same objective system as said write beam.

13. The apparatus as claimed in claim 12 wherein said read beam has a wavelength half that of said write beam.

14. The apparatus as claimed in claim 12 wherein said means for providing a read beam include a frequency doubling device.

15. The apparatus as claimed in claim 14 wherein said read and write beams are provided by the same light generating device with switchable means for switching a frequency doubling device into the light path of said device so as to provide a read beam of half the wavelength of said write beam.

16. Apparatus as claimed in claim 12, wherein the record carrier includes a structure of previously provided tracks whose width substantially determines the width of the information areas.

17. Apparatus as claimed in claim 16, wherein the period of the track structure of the record carrier, transverse to the track direction, is smaller than 1.4 $\mu m$.

18. Apparatus as claimed in claim 16, wherein the track structure of the record carrier is a relief structure and in that the magneto-optical layer has a constant thickness and comprises a material in which during writing information areas are formed by means of magnetic domains starting from a core and expanding outwardly.

19. Apparatus as claimed in claim 18, characterized in that the magneto-optical material of the record carrier is an alloy of gadolinium, terbium and iron.

20. Apparatus as claimed in claim 16, characterized in that the magneto-optical layer within the tracks of the record carrier has a greater sensitivity to magnetization than outside the tracks.

21. Apparatus as claimed in claim 20, characterized in that the magneto-optical layer of the record carrier within a track has a different chemical composition than outside a track.

22. Apparatus as claimed in claim 20, characterized in that the thickness of the magneto-optical layer of the record carrier within a track is different from that outside a track.

* * * * *